Dec. 4, 1928.

H. D. GEYER 1,693,981

OSCILLATING JOINT

Filed Oct. 16, 1926

Inventor
Harvey D. Geyer
By Spencer Hardman & Fehr
Attorney

Patented Dec. 4, 1928.

1,693,981

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

OSCILLATING JOINT.

Application filed October 16, 1926. Serial No. 142,117.

This invention relates to pivot joints and has particular reference to vehicle spring shackles and the pivot joints in various link connections in automobile construction.

An object of this invention is to provide an elastic rubber bushing element wherein the rubber material is put under an initial compression whereby it is held in non-slipping engagement with its contacting metal parts and whereby the amount of undesirable distortion of the rubber material under load is reduced.

Another object is to provide an improved method of putting the elastic rubber material under initial compression.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the several views.

Figure 1:
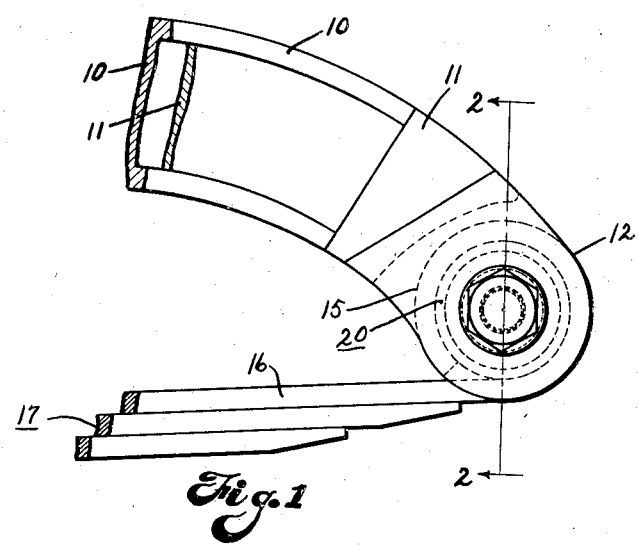
Fig. 1 is a side elevation of the front end of the front spring of an automobile connected to the chassis frame by a pivot shackle built according to this invention.
Figure 2:
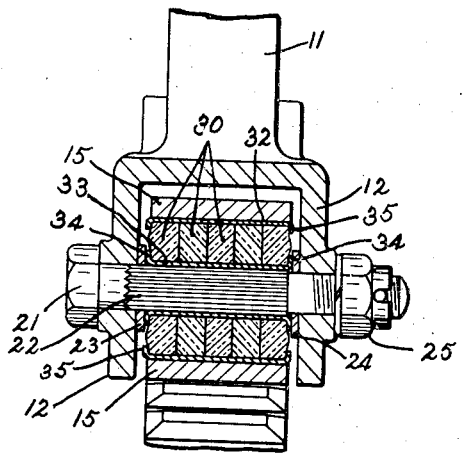
Fig. 2 is a transverse section taken on line 2—2 of Fig. 1.

Numeral 10 designates the downwardly turned front end of the automobile chassis frame which is shown as the ordinary channel construction. 11 is a forged fitting suitably fixed to the end of channel 10 by means of rivets or bolts (not shown). This fitting 11 is provided with two downwardly turned ears 12 spaced apart as clearly shown in Fig. 2. A spring eye 15 is formed on the long leaf 16 of the front spring 17. The flexible bushing element 20 is held fixed at its outer periphery within the spring eye 15. The shackle bolt 21 passes through the center of bushing element 20 and is fixed in non-rotatable relation thereto by the serrations 22 on bolt 21. It will now be clear that all pivotal movement of the spring eye relative to the fitting 11 will be taken up by internal distortion within the bushing element 20.

Figure 3:
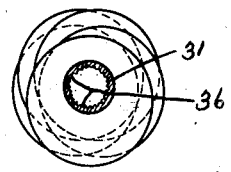
Fig. 3 is a detail view showing the rubber disks inserted over the inner metal sleeve with the outer metal sleeve removed therefrom and illustrates the various positions the rubber disks tend to assume.

This bushing element 20 will now be described. A plurality of elastic rubber disks 30, each having an eccentric aperture 31 therein, are assembled side by side within an outer metal sleeve 32 in such a way that these eccentric holes 31 are angularly spaced uniformly around the axis of sleeve 32, each of the holes 31 being sufficiently large in diameter to overlap and include the axis of sleeve 32. A suitable tool such as a tapered pin is then inserted through the non-aligned holes 31 to bring them into sufficient alignment by distortion of the rubber to permit the insertion of the inner metal sleeve 33 through the holes 31. Preferably this inner sleeve 33, after being inserted as above described, has its ends flared out to form the annular flanges 34. The outer sleeve 32 is also preferably provided with in-turned annular flanges 35 at each end thereof to aid in retaining the disks 30 in place. The inner surface of the inner sleeve 33 has serrations or flutes 36 (see Fig. 3) which cooperate with the serrations 22 on bolt 21 to aid in fixing said sleeve 33 non-rotatably upon bolt 21.

This bushing element 20, made as above described, is pressed within the spring eye 15 and is held therein by the pressed fit. The spring eye with element 20 therein is then inserted between the ears 12 of fitting 11 and the metal washers 23 and 24 slipped into place and the shackle bolt 21 inserted. Then by setting up nut 25 very tight the inner sleeve 33 of the bushing element 20 will be rigidly clamped in place between the ears 12 by a slight springing of said ears 12 and will be positively held against rotation by the corresponding internal serrations on said sleeve 33 and bolt 21. The bolt 21 is held rigid with the ears 12 by setting up nut 25 tightly upon a suitable lock washer.

In operation, the oscillatory pivotal movement of the spring eye 15 relative to the fitting 11 will all be taken up by the internal elastic distortion within the rubber disks 30. The eccentricity of the holes 31 in disks 30 necessitates compression of the rubber on the wide side of each disk when holes 31 are forced into alignment by the insertion of the inner sleeve 33 as described above. These wide sides are arranged uniformly around the inner sleeve (see Fig. 3) and so act to keep the inner sleeve 33 properly centered within the outer sleeve 32 and at the same time form an elastic rubber bushing with initially compressed rubber all around the shackle bolt. This invention provides a simple and efficient method of making an elastic bushing element with the elastic material thereof under the desired initial compression with small tendency to flow or bulge out at the ends of the bushing.

While the form of embodiment of the present invention as herein disclosed, constitutes a preferred form, it is to be understood that other forms might be adopted, all coming within the scope of the claims which follow.

What is claimed is as follows:

1. In combination with the spring and frame of a vehicle, a shackle comprising: an eye member rigid with the spring, a shackle bolt through said eye and rigid with said frame, and a flexible rubber bushing arranged between said eye and bolt, said rubber bushing comprising a plurality of rubber members arranged side by side upon said bolt and confined in place under an initial compression.

2. In a pivot joint between two relatively movable parts, in combination, an eye member rigid with one of said parts, a pivot pin inserted through said eye and rigid with the other of said parts, and a flexible rubber bushing arranged between said eye and pin and held in non-slipping relation thereto, said bushing comprising: a plurality of flexible rubber disks originally formed with eccentric apertures therethrough but retained in place under an initial distortion which forces said apertures to substantially concentric position.

3. In a pivot joint between two relatively movable parts, in combination, an eye member rigid with one of said parts, a pivot pin inserted through said eye and rigid with the other of said parts, and a flexible rubber bushing retained within outer and inner metal shells and arranged between said eye and pin and held in non-slipping relation thereto, said bushing comprising: a plurality of flexible rubber disks originally formed with eccentric apertures therethrough but retained in place under an initial distortion which forces said apertures to substantially concentric position.

4. In a pivot joint, a flexible bushing element comprising: outer and inner metal sleeves, a plurality of flexible rubber disks each having an originally eccentric aperture therein and arranged within said outer sleeve, said inner sleeve being inserted through said apertures holding them in alignment, whereby the rubber of said bushing is put under an initial compression.

5. In a pivot joint, a flexible bushing element comprising: outer and inner metal sleeves, a plurality of flexible rubber disks each having an originally eccentric aperture therein and arranged within said outer sleeve so that said apertures are substantially uniformly distributed around the central axis of said outer sleeve, said inner sleeve being inserted through said apertures holding them in alignment, whereby the rubber of said bushing is put under an initial compression.

6. In a pivot joint, a flexible bushing element comprising: an inner metal sleeve, a plurality of flexible rubber disks having eccentric apertures therein inserted over said inner sleeve, and an outer metal sleeve holding said rubber disks compressed into substantial alignment.

7. In a pivot joint, a flexible bushing element comprising: an inner metal sleeve, a plurality of flexible rubber disks having eccentric apertures therein inserted over said inner sleeve, and an outer metal sleeve holding said rubber disks compressed into substantial alignment, said outer sleeve having in-turned annular flanges at each end for retaining said rubber disks in place.

In testimony whereof I hereto affix my signature.

HARVEY D. GEYER.